United States Patent
Deutschmann et al.

(10) Patent No.: US 12,434,659 B1
(45) Date of Patent: Oct. 7, 2025

(54) VEHICLE AIRBAG MODULE INCLUDING TETHERED DEPLOYMENT GUIDE

(71) Applicant: Toyoda Gosei Co., Ltd., Kiyosu (JP)

(72) Inventors: Roy Peter Deutschmann, South Lyon, MI (US); Brandon Dean Streeter, Howell, MI (US); Alexandra Marie Lazaros, Northville, MI (US); Srinivas Krishnan, Troy, MI (US); Roland Dominic Furtado, Novi, MI (US)

(73) Assignee: Toyoda Gosei Co., LTD., Kiyosu (JP)

( * ) Notice: Subject to any disclaimer, the term of this patent is extended or adjusted under 35 U.S.C. 154(b) by 0 days.

(21) Appl. No.: 18/668,949

(22) Filed: May 20, 2024

(51) Int. Cl.
*B60R 21/2338* (2011.01)
*B60R 21/16* (2006.01)

(52) U.S. Cl.
CPC .... *B60R 21/2338* (2013.01); *B60R 2021/161* (2013.01)

(58) Field of Classification Search
CPC .... B60R 2021/161; B60R 2021/23161; B60R 2021/23386; B60R 2021/23388; B60R 21/205; B60R 21/216; B60R 21/2338
See application file for complete search history.

(56) References Cited

U.S. PATENT DOCUMENTS

| | | | | |
|---|---|---|---|---|
| 5,265,903 A * | 11/1993 | Kuretake | ............ | B60R 21/2338 280/730.2 |
| 5,306,042 A * | 4/1994 | Frank | .................. | B60R 21/216 280/732 |
| 5,348,343 A * | 9/1994 | Hawthorn | ............... | B60R 21/16 280/743.1 |
| 5,385,366 A * | 1/1995 | Frank | .................... | B60R 21/216 280/732 |
| 5,398,959 A * | 3/1995 | Avila | .................... | B60R 21/215 280/732 |
| 6,464,255 B1 * | 10/2002 | Preisler | ................. | B60R 21/206 280/752 |
| 8,550,491 B2 * | 10/2013 | Kuroe | .................. | B60R 21/216 280/728.2 |
| 8,888,125 B2 * | 11/2014 | Ory | ....................... | B60R 21/216 280/743.2 |
| 10,946,825 B2 * | 3/2021 | Ghannam | ............. | B60R 21/205 |
| 11,247,632 B2 * | 2/2022 | Malapati | ............... | B60R 21/205 |
| 11,447,089 B2 | 9/2022 | Deutschmann et al. | | |

(Continued)

FOREIGN PATENT DOCUMENTS

JP 07164986 A * 6/1995 ........... B60R 21/216

*Primary Examiner* — Laura Freedman
(74) *Attorney, Agent, or Firm* — Christopher G. Darrow; Darrow Mustafa PC

(57) ABSTRACT

An airbag module includes a housing and an inflatable cushion structured to be received in the housing. A deployment guide is attached to the housing and is structured to be deployable from the housing to a deployed condition to guide the inflatable cushion in an associated occupant contact direction during cushion inflation. A first side tether is structured to extend along a first side of the deployment guide and includes a first portion structured to be attachable to a portion of a vehicle at a first attachment location of the first side tether. A second portion of the first side tether is attached to the deployment guide at a second attachment location of the first side tether. The second attachment location is structured to reside above the first attachment location of the first side tether.

20 Claims, 9 Drawing Sheets

(56) References Cited

U.S. PATENT DOCUMENTS

| | | | |
|---|---|---|---|
| 11,872,949 B2* | 1/2024 | Nakanishi | B60R 21/205 |
| 11,891,007 B1* | 2/2024 | Smitterberg | B60R 21/205 |
| 11,891,009 B1* | 2/2024 | Smitterberg | B60R 21/2165 |
| 12,012,064 B2* | 6/2024 | Smitterberg | B60R 21/205 |

* cited by examiner

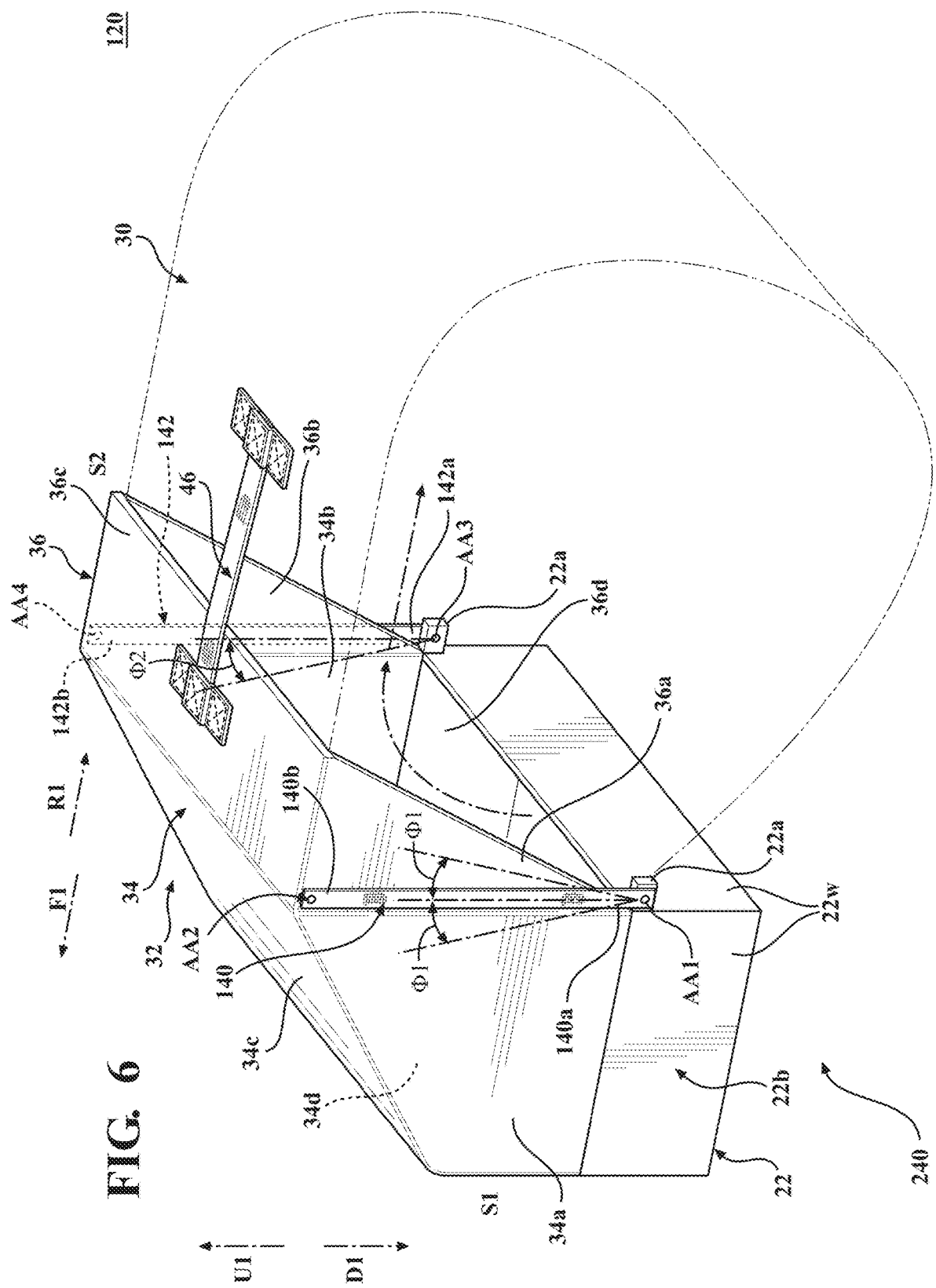

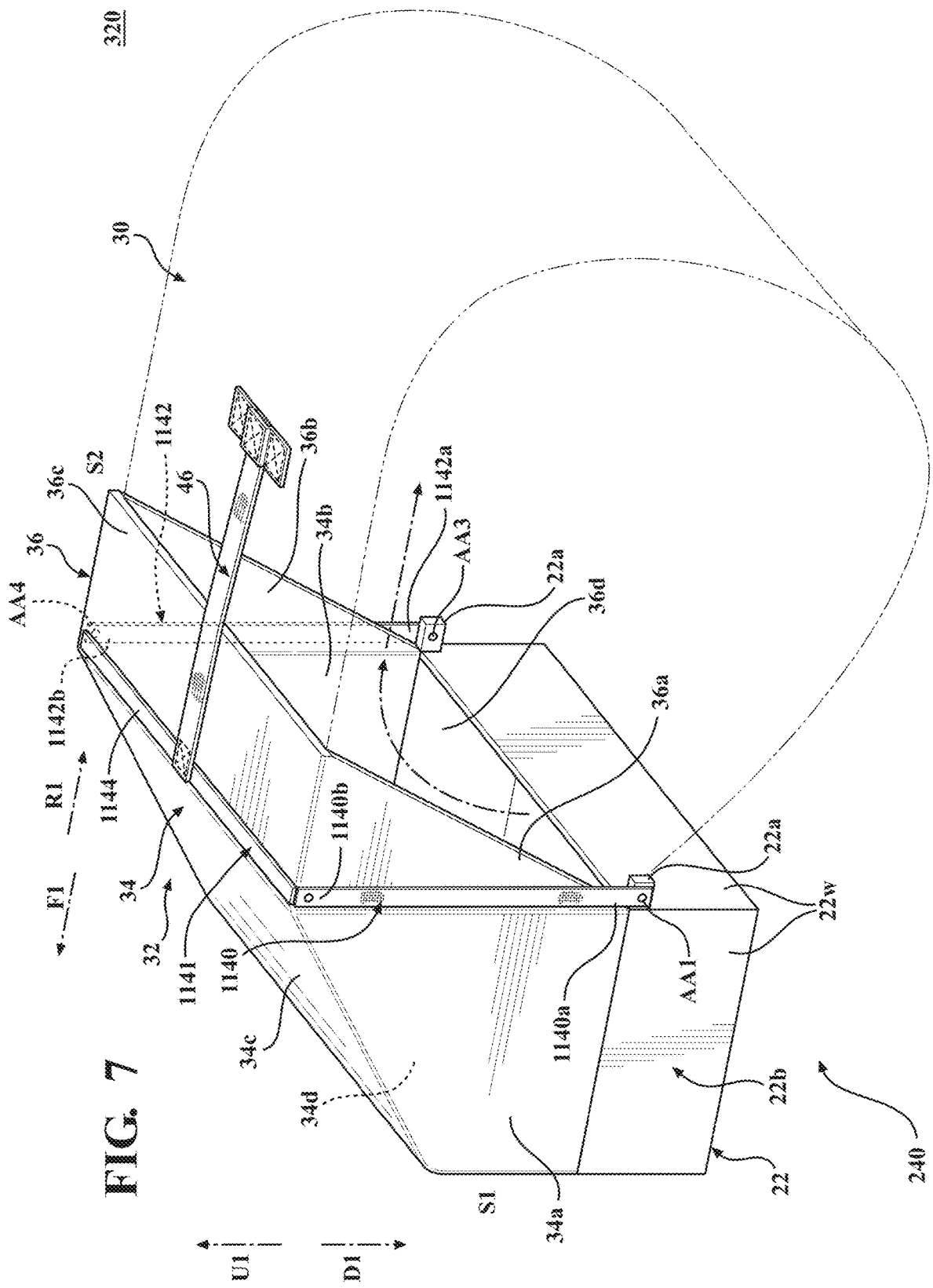

VEHICLE AIRBAG MODULE INCLUDING TETHERED DEPLOYMENT GUIDE

FIELD

The subject matter described herein relates in general to vehicle occupant protection systems employing inflatable cushions and, more particularly, to an airbag module providing built-in reaction surfaces to facilitate deployment of the inflatable cushion.

BACKGROUND

A vehicle airbag module may include an inflatable cushion deployable from the vehicle instrument panel. Effective deployment of the cushion requires a reaction surface (i.e., a surface contacted by the inflating cushion and against which a portion of the remainder of the inflating cushion can push, to further expand in direction(s) away from the reaction surface) to maintain acceptable cushion kinematics during deployment. Existing airbag modules may be configured so that the inflatable cushion reacts against the vehicle front windshield during deployment. During and/or after deploying, the cushion may tend to rotate upwardly and forwardly (i.e., in a direction toward the windshield), away from the occupant. Use of the front windshield as a reaction surface may help prevent the cushion from rotating away from the occupant.

However, with emerging trends such as autonomous and electric vehicles, there are significant changes being seen in vehicle interior environments. The windshield angle may become steeper, or the distance between the windshield and the occupant may increase above currently known levels. To utilize the front windshield as a reaction surface in such modified vehicle designs would require an unacceptable increase in the size of the inflatable cushion.

SUMMARY

An airbag module includes a housing and an inflatable cushion structured to be received in the housing. A deployment guide is attached to the housing and is structured to be deployable from the housing to a deployed condition to guide the inflatable cushion in an occupant contact direction during cushion inflation. A first side tether is structured to extend along a first side of the deployment guide. The first side tether includes a first portion structured to be attachable to a portion of a vehicle at a first attachment location of the first side tether when the airbag module is mounted on the vehicle. A second portion of the first side tether is attached to the deployment guide at a second attachment location of the first side tether. The second attachment location is structured to reside above the first attachment location of the first side tether when the airbag module is mounted on the vehicle and the deployment guide is in its deployed condition.

BRIEF DESCRIPTION OF THE DRAWINGS

FIG. 6 is a schematic perspective view of an airbag module in accordance with another embodiment described herein, showing the inflatable cushion in a fully deployed condition similar to that shown in FIG. 3C.

FIG. 7 is a schematic perspective view of an airbag module in accordance with another embodiment described herein, incorporating a continuous tether attached to an extension channel of the airbag module.

DETAILED DESCRIPTION

Figure 1:
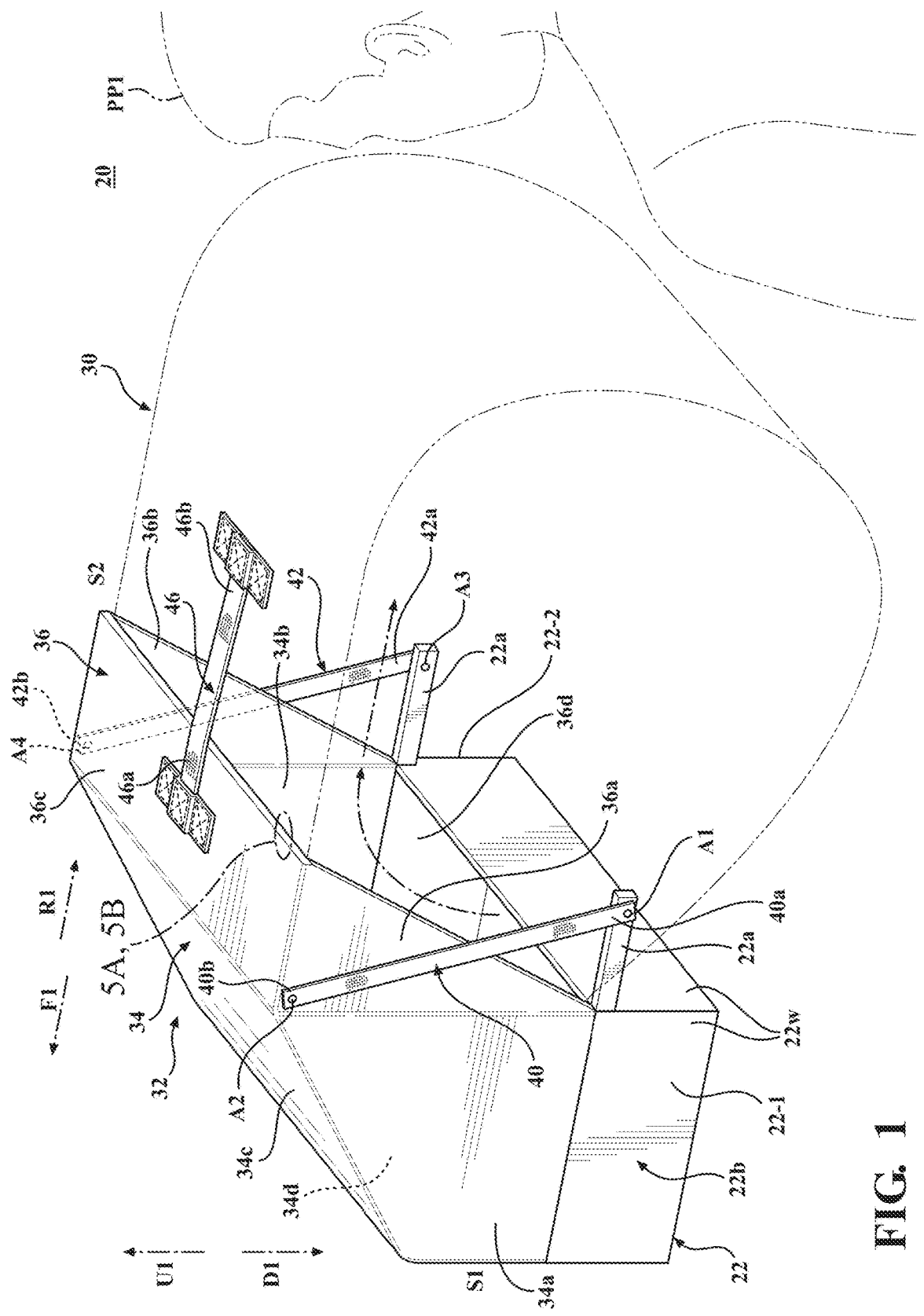
FIG. 1 is a schematic perspective view of an airbag module in accordance with an embodiment described herein, showing an inflatable cushion of the airbag module in a fully deployed condition adapted for cushioning a vehicle occupant during a collision event.

An airbag module includes a housing and an inflatable cushion structured to be received in the housing. A deployment guide is attached to the housing and is structured to be deployable from the housing to a deployed condition to guide the inflatable cushion in an occupant contact direction of the airbag module during cushion inflation. An extension channel may be attached to the deployment channel and structured to be deployable from the deployment channel. A first side tether is structured to extend along a first side of the deployment guide and includes a first portion structured to be attachable to a portion of a vehicle at a first attachment location of the first side tether. A second portion of the first side tether is attached to the deployment guide at a second attachment location of the first side tether. The second attachment location is structured to reside above the first attachment location of the first side tether. Embodiments may also incorporate at least one additional side tether and at least one intermediate tether. The tethers are structured to be operable to rigidify and constrain motion of the deployment channel and/or extension channel when the portions of the deployment channel and/or extension channel are pressurized by inflation of the cushion inside the deployment channel and extension channel. The tethers may operate to maintain the deployment channel and extension channel in their respective fully deployed conditions under forces applied by the inflatable cushion as it continues to inflate to its end-use configuration.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to the drawings, as used herein, the terms "rearwardly" and "rearward" refer to a direction R1 extending toward a rearmost end of a vehicle in which the airbag module is mounted. As used herein, "forwardly" and "forward" refer to a direction F1 extending toward a forward end or front of a vehicle in which the airbag module is mounted. In some arrangements, depending on whether or not a road surface on which the vehicle resides is horizontal, the design of the airbag module, and other pertinent factors, the directions F1 and R1 may lie along a horizontal plane. As used herein, "upwardly" and "downwardly" refer to an upward direction U1 and a downward direction D1, respectively, from the perspective of an occupant seated in a front seat of the vehicle when the vehicle is positioned on a ground surface. Similarly, a feature of an airbag module embodiment described herein may be positioned or reside vertically "above" or "below" another feature from the perspective of an occupant seated in a front seat of the vehicle when the vehicle is positioned on a ground surface.

Components of the airbag module described herein may be attached to each other directly (i.e., with the components in direct physical contact with each other) or indirectly (e.g., with two or more components connected by an intermediate element interposed between the components). Components may be attached to each other using any means (e.g., stitching, adhesives, fasteners, etc.) suitable for enabling the components and airbag module to perform the functions described herein.

FIG. 1 is a schematic perspective view of an airbag module 20 in accordance with an embodiment described herein, showing an inflatable cushion 30 of the airbag module in a fully deployed condition adapted for cushioning a vehicle occupant PPI during a collision event. In some arrangements, the airbag module 20 may be incorporated into a comprehensive vehicle occupant restraint system. The airbag module 20 may be mounted in an airbag module mounting structure positioned in (and/or defining a portion of) the occupant compartment. The airbag module mounting structure may be a structure in which the airbag module is mounted, or to which the airbag module is attached. In one or more arrangements, the airbag module mounting structure may be a dashboard or instrument panel (not shown) of the vehicle. In other arrangements, the airbag module mounting structure may be a table, console, divider or other structure positioned in the occupant compartment, for example, between two oppositely facing seats. Other forms of the airbag module mounting structure are also possible. The inflatable cushion 30 is in its fully deployed condition when the cushion has been inflated to its final, end-use configuration for use in cushioning the vehicle occupant.

Generally, an airbag module in accordance with an embodiment described herein may be mounted and structured to deploy in an occupant contact direction when activated. An "occupant contact direction" is a direction extending from the airbag module toward an occupant of a seat opposite which the airbag module is positioned, the occupant being who the airbag module is designed to protect during a collision event. Thus, in one or more arrangements described herein, an airbag of a given airbag module may be mounted and structured to deploy in an associated occupant contact direction toward an associated occupant seated anywhere in the occupant compartment and facing in any direction. This airbag may be structured to help secure the occupant in the associated seat and to otherwise immobilize the occupant to aid in preventing injury.

Figure 2:
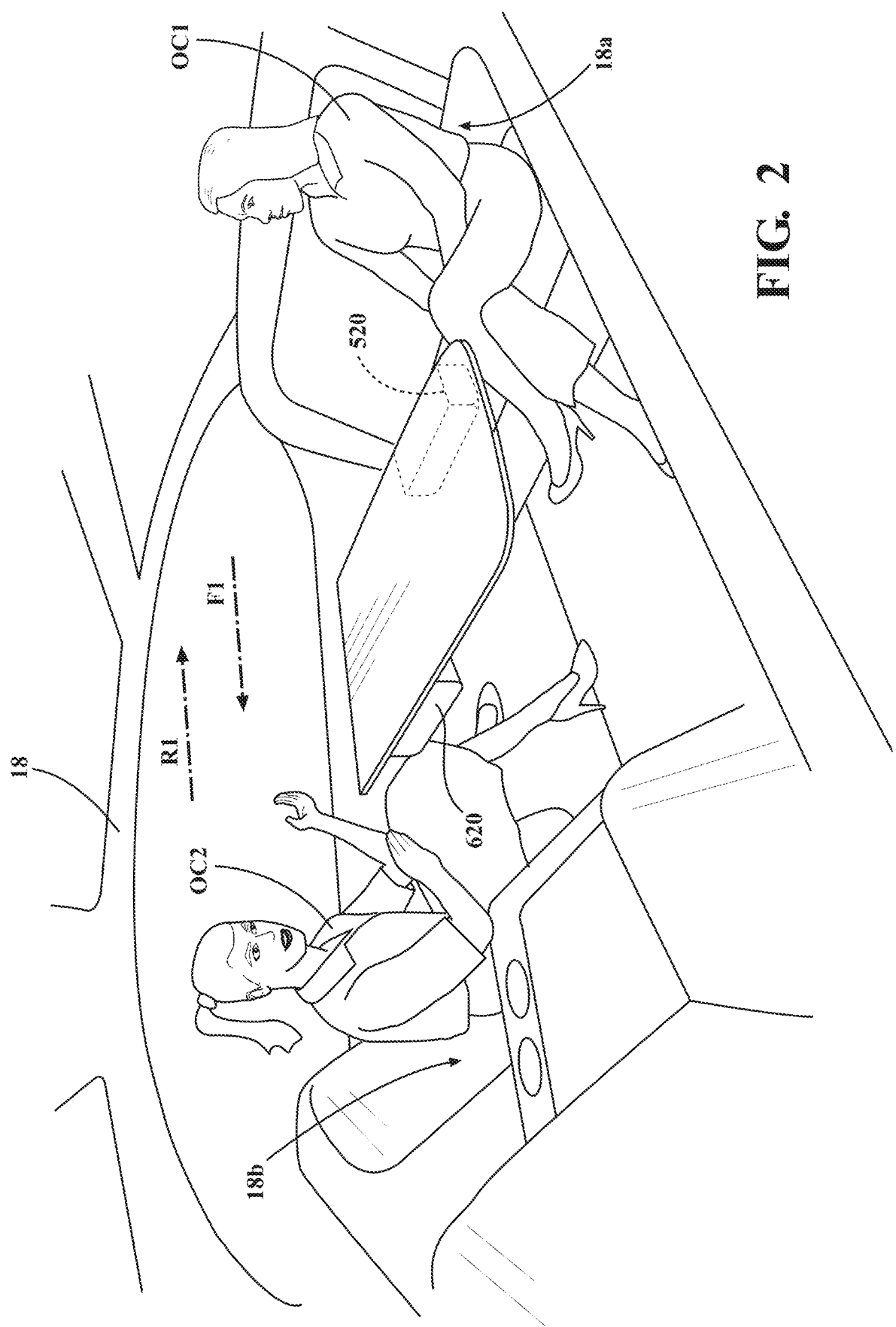
FIG. 2 is a schematic perspective view of an exemplary vehicle occupant compartment showing occupant seats facing in opposite directions.

For example, FIG. 2 is a schematic perspective view of an exemplary vehicle occupant compartment showing occupant seats facing in opposite directions. Referring to FIG. 2, a vehicle 18 (e.g., an autonomous or driverless vehicle) may have seats facing in multiple directions. Vehicle 18 has at least one seat 18a facing forwardly in direction F1 and at least one seat 18b facing rearwardly in direction R1. An airbag module 520 may be mounted so as to deploy in an associated occupant contact direction R1 toward an associated seat 18a as described herein to help secure the occupant OC1 in the associated seat 18a and to otherwise immobilize the occupant OC1 to aid in preventing injury. Similarly, an airbag module 620 may be mounted so as to deploy in an associated occupant contact direction F1 toward an associated seat 18b as described herein to help secure the occupant OC2 in the associated seat 18b and to otherwise immobilize the occupant OC2 to aid in preventing injury. Additional seats (not shown) may face in other directions with an associated airbag module in accordance with an embodiment described herein positioned opposite each seat. Each airbag module(s) may be structured and mounted so as to deploy in an associated occupant contact direction toward an associated seat as described herein to help secure the occupant in the associated seat and to otherwise immobilize the occupant to aid in preventing injury.

Referring again to FIG. 1, the airbag module 20 may include a housing 22. The airbag module housing 22 may have a body 22b formed by a plurality of intersecting walls 22w combining to define a cavity 22c structured for storing other components of the airbag module prior to deployment of the inflatable cushion 30. The housing cavity 22c may include an open top 22t structured to enable deployment of the inflatable cushion 30 therefrom. In some arrangements, the open top 22t may be coverable by an associated breakaway panel (not shown) located on the airbag module mounting structure. In some arrangements, one or more tether anchor(s) 22a may project in an associated occupant contact direction from an exterior of the housing body 22b to enable attachment of one or more airbag module tethers thereto, as described herein. In the arrangement shown in FIG. 1, the occupant contact direction is a direction extending in an associated occupant contact direction (i.e., in direction R1) from the housing 22. In other arrangements, one or more tethers may be attached to another portion of the housing 22 or to another portion of the vehicle. The housing 22 may be formed from a suitable rigid material, such as a metal or polymer material.

The airbag module 20 may include an inflatable cushion or airbag 30 structured to be received in the housing cavity 22c. The inflatable cushion 30 may be structured to be foldable for stowage in the housing cavity 22c prior to deployment. The inflatable cushion 30 may be structured to deploy generally upwardly (in direction U1) and in the associated occupant contact direction (i.e., rearwardly in FIG. 1) to cushion a vehicle occupant propelled forwardly (in direction F1) during a collision event.

The airbag module 20 may include additional elements (not shown) operably connected to the inflatable cushion and configured to enable and/or facilitate operation of the airbag module as described herein. As used herein, "operably connected" may encompass direct, physical connections or indirect connections. These additional elements may include, for example, an airbag inflator operably connected to the inflatable cushion and structured to be actuatable responsive to a control signal to provide inflation gas to inflate the cushion. The airbag module may include sensor(s) configured to detect condition(s) indicative of a collision event. The airbag module may include a controller incorporating a processor configured to interpret sensor data to predict a collision event, determine that a collision event is occurring, and/or generate a control signal triggering inflation of the inflatable cushion. Other elements may also be included in the airbag module. Unless otherwise described herein, elements of the airbag module 20 may be located inside the housing cavity 22c, attached to an exterior of the housing 22, or positioned separate from the housing 22 at another location in the vehicle.

Referring to FIG. 1, the airbag module 20 may include a deployment guide 32 attached to the housing 22 and structured to be deployable from the housing 22 to a deployed condition to guide the inflatable cushion in the associated occupant contact direction during cushion inflation, and to otherwise control inflation and deployment directions of the inflatable cushion 30. In one or more arrangements, when the deployment guide 32 includes a deployment channel 34 (described below) but no extension channel 36 (described below), a "deployed condition" of the deployment guide occurs when the deployment channel is fully deployed (i.e. when the deployment channel is in the configuration it has when the inflatable cushion 30 is fully inflated to its end-use configuration). When the deployment guide 32 includes both a deployment channel 34 and an extension channel 36, a "deployed condition" of the deployment guide 32 occurs when both the deployment channel 34 and the extension channel 36 are fully deployed (i.e. in the configurations the deployment channel and the extension channel has when the inflatable cushion 30 is fully inflated to its end-use configuration). It is noted that the deployment channel 34 and the extension channel 36 may be fully deployed prior to full inflation of the inflatable cushion 30 being achieved.

Referring to the drawings, the deployment guide 32 may include a deployment channel 34 attached to the housing 22 and structured to be deployable from the housing to guide the inflatable cushion 30 in the associated occupant contact direction during cushion inflation when the deployment guide 32 is in the deployed condition. The deployment channel 34 may be structured to be foldable inside the housing cavity 22c when inflatable cushion 30 is stowed in the housing cavity 22c prior to deployment. To this end, the elements of the deployment channel 34 may be fabricated from a pliable (but not stretchable) material or materials, such as a fabric or polymer sheet material, for example.

The deployment channel 34 is structured to be expandable under pressure exerted by the cushion 30 during inflation, from a folded condition to the deployed condition. The deployment channel 34 is structured to guide deployment of the inflatable cushion 30 in the associated occupant contact direction (i.e., the rearward direction R1 of the vehicle in FIGS. 1-3) when the deployment channel 34 is in its deployed condition.

The deployment channel 34 may be structured to define reaction surfaces for the inflatable cushion, to control the degree and direction of inflation as the cushion 30 inflates. "Reaction surfaces" are surfaces of the airbag module 20 which the inflatable cushion bears against during inflation, providing resistance to cushion expansion in the direction of the reaction surface and forcing the cushion 30 to expand in a direction providing relatively less resistance.

In one or more arrangements, the deployment channel 34 may include opposed first and second side portions 34a, 34b, respectively. Edges of the first and second side portions 34a, 34b may be secured to walls of housing 22. The deployment channel 34 may be structured so that the first and second side portions 34a, 34b form side reaction surfaces structured to restrict lateral expansion of the inflatable cushion 30 during cushion inflation, when the deployment channel 34 is fully deployed.

The deployment channel 34 may also include a connecting portion 34c extending between and connecting the first and second side portions 34a, 34b. The deployment channel 34 may be structured so that the connecting portion 34c forms a frontal reaction surface structured to guide expansion of the inflatable cushion 30 in the associated occupant contact direction R1 during cushion inflation, when the deployment channel 34 is fully deployed. In some arrangements, the connecting portion 34c may also form an upper reaction surface structured to restrict expansion of the inflatable cushion 30 in an upward direction U1 during cushion inflation, when the deployment channel 34 is fully deployed.

The first and second side portions 34a, 34b and the connecting portion 34c may be formed as a single piece, or these portions may be formed separately and attached to each other using stitching and/or any other suitable method. The first and second side portions 34a, 34b and the connecting portion 34c may combine to define a cavity 34d into which the cushion 30 expands during inflation. The cavity 34d may define an opening 34e structured to face in the associated occupant contact direction when the deployment channel 34 is deployed, so that the deployment channel 34 guides the cushion 30 rearwardly during inflation. The first and second side portions 34a, 34b and the connecting portion 34c may be attached to the housing 22 along edges of the first and second side portions 34a, 34b and the connecting portion 34c.

Referring to the drawings, in one or more arrangements, the deployment guide 32 may also include an extension channel 36 attached to the deployment channel 34 and structured to be deployable from the deployment channel 34 to extend in the associated occupant contact direction from the deployment channel, to guide the inflatable cushion 30 further in the associated occupant contact direction during cushion inflation when the deployment guide 32 is in its deployed condition. The extension channel 36 may be structured to be foldable inside the housing cavity 22c when inflatable cushion 30 is stowed in the housing cavity prior to deployment. To this end, the elements of the extension channel 36 may be fabricated from a pliable (but not stretchable) material or materials, such as a fabric or polymer sheet material, for example.

The extension channel 36 is structured to be expandable under pressure exerted by the cushion 30 during inflation, from a folded condition to the deployed condition. The extension channel 36 is structured to further guide deployment of the inflatable cushion 30 in in the associated occupant contact direction when the extension channel is in its deployed condition.

In one or more arrangements, the extension channel 36 may include a first side portion 36a attached to the deployment channel 34, a second side portion 36b positioned opposite the extension channel first side portion 36a and attached to the deployment channel 34, and an extension channel connecting portion 36c extending between and connecting the extension channel first and second side portions 36a, 36b. The first and second side portions 36a, 36b and the connecting portion 36c may be attached to the deployment channel 34 along associated edges of the first and second side portions 34a, 34b and the connecting portion 34c of the deployment channel 34. For example, the extension channel first side portion 36a may be attached to an edge of the deployment channel first side portion 34a closest to the vehicle seat (not shown) associated with the airbag module 20. Similarly, the extension channel second side portion 36b may be attached to an edge of the deployment channel second side portion 34b closest to the vehicle seat associated with the airbag module 20. Also, the extension channel connecting portion 36c may be attached to an edge of the deployment channel connecting portion 34c closest to the vehicle seat associated with the airbag module 20.

The extension channel 36 may be structured to define reaction surfaces for the inflatable cushion 30, to control the degree and direction of inflation as the cushion inflates. The extension channel 36 may be structured so that the first and second side portions 36a, 36b form side reaction surfaces structured to restrict lateral expansion of the inflatable cushion 30 during cushion inflation, when the extension channel 36 is fully deployed. The connecting portion 36c may form an upper reaction surface structured to restrict expansion of the inflatable cushion 30 in an upward direction U1 during cushion inflation, when the extension channel 36 is fully deployed.

The first and second side portions 36a, 36b and the connecting portion 36c of the extension channel 36 may be formed as a single piece, or these portions may be formed separately and attached to each other using stitching and/or any other suitable method. The first and second side portions 36a, 36b and the connecting portion 36c may combine to define a cavity 36d into which the cushion 30 expands during inflation. The cavity 36d may define an opening structured to face in the associated occupant contact direction when the extension channel 36 is deployed, so that the extension channel cavity 36d guides the cushion 30 in the associated occupant contact direction during inflation.

Figure 5A:
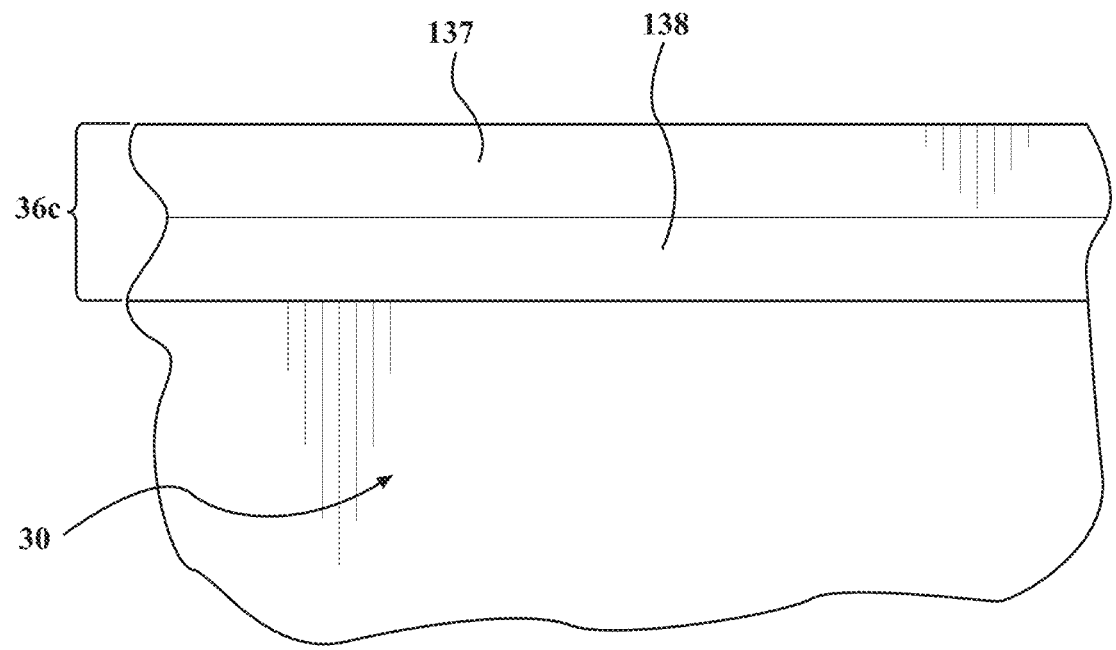
FIG. 5A is a schematic partial end view of a connecting portion of an airbag module extension channel in accordance with a particular embodiment described herein, shown prior to expansion of an inflatable cushion into contact with the connecting portion.
Figure 5B:
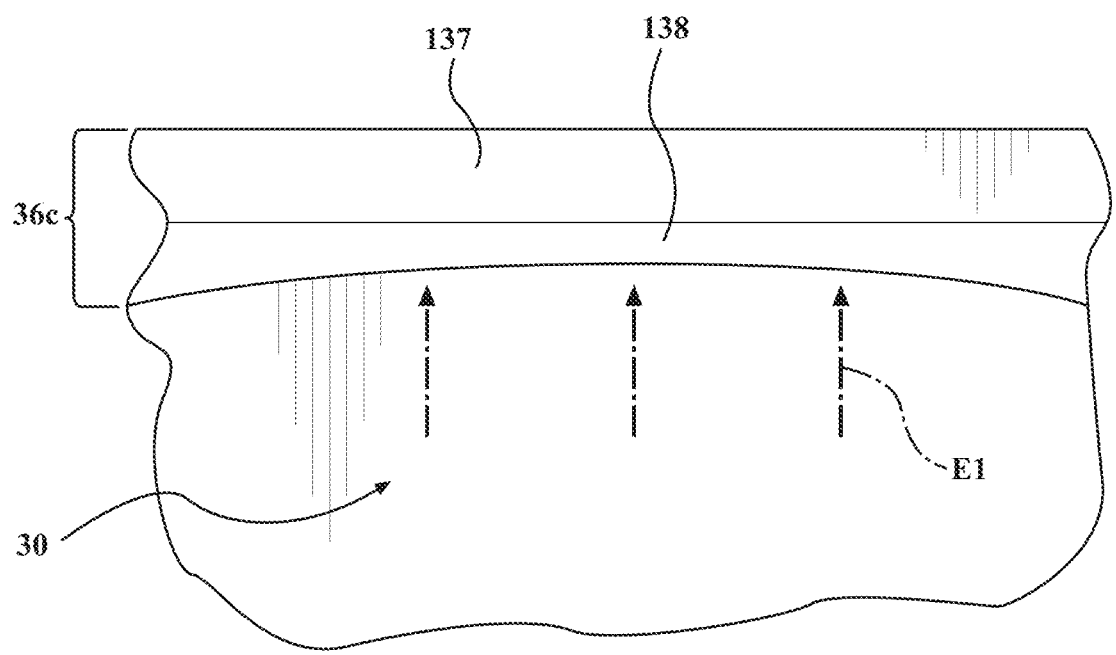
FIG. 5B is the schematic partial end view of FIG. 5A, showing deformation of a layer of the connecting portion due to pressure applied by the inflating cushion.

FIGS. 5A and 5B are schematic partial end views of a connecting portion of an extension channel in accordance with a particular embodiment described herein. In particular arrangements, the extension channel connecting portion 36c may be formed from multiple layers stacked generally orthogonally with respect to the occupant contact direction, the layers may include an inner layer 138 structured to be physically contacted by the inflatable cushion 30 during expansion, and an outer layer 137 in contact with the inner layer 138. The inner layer 138 may be structured to be deformable to absorb a portion of the energy of the inflatable cushion as it impacts the connecting portion during expansion. To this end, the inner layer 138 may be formed from a relatively compressible material, such as a rubber, foam, or another suitable polymeric material. The outer layer 137 may be formed from a material having a relatively greater rigidity than the material of inner layer 138, to help guide the deployment direction of the inflatable cushion. FIG. 5A shows the connecting portion 36c prior to expansion of the inflatable cushion 30 into contact with the connecting portion. FIG. 5B shows deformation of the inner layer 138 of the connecting portion (in direction E1) due to pressure applied by the inflating cushion 30.

Embodiments of the airbag module described herein may include one or more tethers structured to be operable to rigidify and constrain motion of the side portions and connecting portions of the deployment channel and/or extension channel when the portions of the deployment channel and/or extension channel are pressurized by inflation of the cushion inside the deployment channel and extension channel cavities. The tethers may operate to maintain the deployment channel and extension channel in their respective fully deployed conditions under forces applied by the inflatable cushion as it continues to inflate to its end-use configuration as shown in FIG. 1.

Any of the tethers described herein may be attached to other elements of the airbag module 20 using stitching, adhesives, and/or any other attachment method(s) suitable for the operations described herein. The tethers may be structured to be foldable inside the housing cavity 22c when inflatable cushion 30 is stowed in the housing cavity prior to deployment. To this end, the tethers may be fabricated from a pliable (but not stretchable) material or materials, such as a fabric, filaments formed into a webbing structure, or polymer sheet material, for example. This ensures that each tether will maintain a predefined overall length even when subject to forces exerted on the tethers by expansion of the inflatable cushion.

Referring to FIG. 1, in one or more arrangements, the airbag module 20 may include a first side tether 40 structured to extend along a first side S1 of the deployment guide 32. In some arrangements, the first side tether 40 may extend along an exterior of the first side S1 of the deployment guide 32. An exterior of a side of any of the deployment guide 32, deployment channel 34 and the extension channel 36 is a portion of the respective guide/channel residing outside any of the cavities 34d and 36d defined by the deployment channel 34 and the extension channel 36 when the channels are in their respective deployed conditions. In some arrangements, the first side tether 40 may extend along an interior of the first side S1 of the deployment guide 32. An interior of a side of any of the deployment guide 32, deployment channel 34 and the extension channel 36 is a portion of the respective guide/channel residing inside one or more of the cavities 34d and 36d defined by the deployment channel 34 and the extension channel 36 when the channels are in their respective deployed conditions.

in one or more arrangements, the first side tether 40 may include a first portion 40a structured to be attachable to a portion of a vehicle at a first attachment location A1 of the first side tether 40 when the airbag module 20 is mounted on the vehicle. The module 20 is considered to be "mounted on the vehicle" when the module is attached to the vehicle in its end use position on the vehicle (i.e., behind a dashboard, etc.) In some arrangements, as seen in FIG. 1, the portion of the vehicle to which the first side tether first portion 40a is attached is the housing 22. For example, the first side tether first portion 40a may be attached to a tether anchor 22a. In other arrangements, the portion of the vehicle to which the first side tether first portion 40a is attached is a portion of the vehicle other than the housing 22.

The first side tether 40 may also include a second portion 40b attached to the deployment guide 32 at a second attachment location A2 of the first side tether 40. In some arrangements, as shown in FIG. 1, the second attachment location A2 of the first side tether 40 may be along a side edge of the extension channel connecting portion 36c. In other arrangements, the second attachment location A2 of the first side tether 40 may be along the deployment channel 34. In particular arrangements, as shown in FIG. 1, the second attachment location A2 of the first side tether 40 may be structured to reside above the first attachment location A1 of the first side tether 40 when the airbag module 20 is mounted on the vehicle and the deployment guide 32 is in its deployed condition. In more particular arrangements, the second attachment location A2 of the first side tether 40 may be positioned at a location in a direction opposite the occupant contact direction with respect to the first attachment location A1 of the first side tether 40 when the airbag module 20 is mounted on the vehicle and the deployment guide 32 is in its deployed condition. In this arrangement, the first side tether 40 may form a non-zero angle θ1 (FIG. 3C) with respect to a vertical plane V1 extending through the first attachment location A1 when the deployment channel 34 is in its deployed condition.

Referring again to FIG. 1, in one or more arrangements, the airbag module 20 may also include a second side tether 42 structured to extend along a second side S2 of the deployment guide 32 opposite the first side S1. in one or more arrangements, the second side tether 42 may include a first portion 42a structured to be attachable to a portion of a vehicle at a first attachment location A3 of the second side tether 42 when the airbag module 20 is mounted on the vehicle. In some arrangements, as seen in FIG. 1, the portion of the vehicle to which the second side tether first portion 42a is attached is the housing 22. For example, the second side tether first portion 42a may be attached to tether anchor 22a. In other arrangements, the portion of the vehicle to which the second side tether first portion 42a is attached is a portion of the vehicle other than the housing 22.

The second side tether 42 may also include a second portion 42b attached to the deployment guide 32 at a second attachment location A4 of the second side tether 42. The second attachment location A4 may be structured to reside above the first attachment location A3 of the second side tether 42 when the airbag module 20 is mounted on the vehicle and the deployment guide 32 is in the deployed condition. In some arrangements, as shown in FIG. 1, the second attachment location A4 of the second side tether 42 may be along a side edge of the extension channel connecting portion 36c. In other arrangements, the second attachment location A4 of the second side tether 42 may be along the deployment channel 34. In particular arrangements, as shown in FIG. 1, the second attachment location A4 of the second side tether 42 may be structured to reside above the first attachment location A3 of the second side tether 42 when the airbag module 20 is mounted on the vehicle and the deployment guide 32 is in its deployed condition. In more particular arrangements, the second attachment location A4 of the second side tether 42 may be positioned at a location in a direction opposite the occupant contact direction with respect to the first attachment location A3 of the second side tether 42 when the airbag module 20 is mounted on the vehicle and the deployment guide 32 is in its deployed condition. In this arrangement, the second side tether 42 may form a non-zero angle θ2 (FIG. 3C) with respect to the vertical plane V1 extending through the first attachment location A3 when the deployment channel 34 is in its deployed condition.

Referring to FIG. 1, in one or more arrangements, the airbag module 20 may include at least one intermediate tether 46 having a first portion 46a attached to the extension channel 36 and a second portion 46b attached to the inflatable cushion 30. An "intermediate tether" is a tether positioned between vertical parallel planes extending through opposite lateral sides 22-1, 22-2 of the housing 22 when the airbag module 20 is mounted on the vehicle.

The at least one intermediate tether 46 may aid in preventing rotation of the deployment guide 32 in a direction opposite the occupant contact direction during inflation of the inflatable cushion 30. In one or more arrangements, the intermediate tether first portion 46a is attached to the extension channel connecting portion 36c, and the intermediate tether 46 is structured to exert a force on the extension channel connecting portion 36c (and the deployment channel 34 attached to the extension channel 36) in the occupant contact direction during inflation of the cushion 30.

In an embodiment of the airbag module not incorporating an extension channel, the intermediate tether first portion 46a may be attached to the deployment channel connecting portion 34c.

Figure 3A:
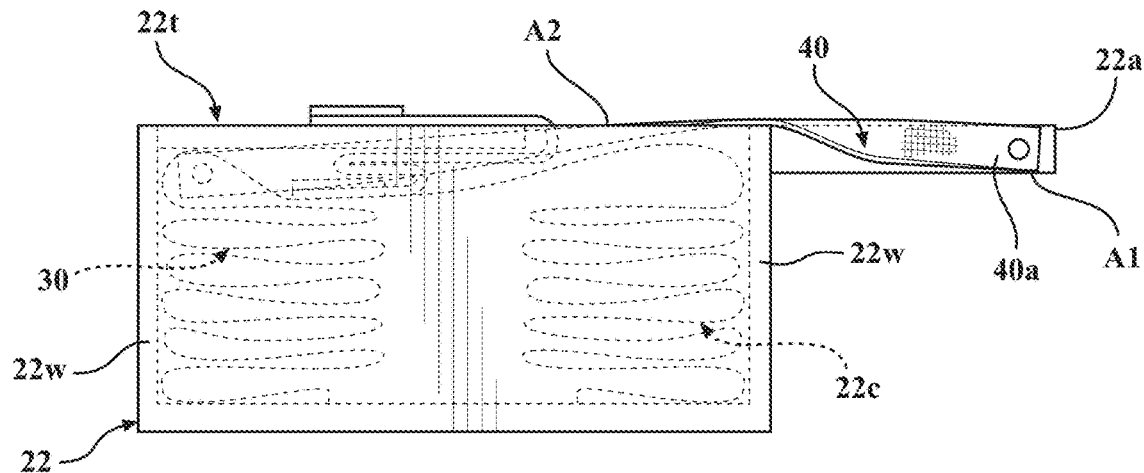
FIG. 3A is a schematic side view of an airbag module in accordance with an embodiment described herein, shown prior to deployment of an inflatable cushion incorporated into the airbag module.
Figure 3B:
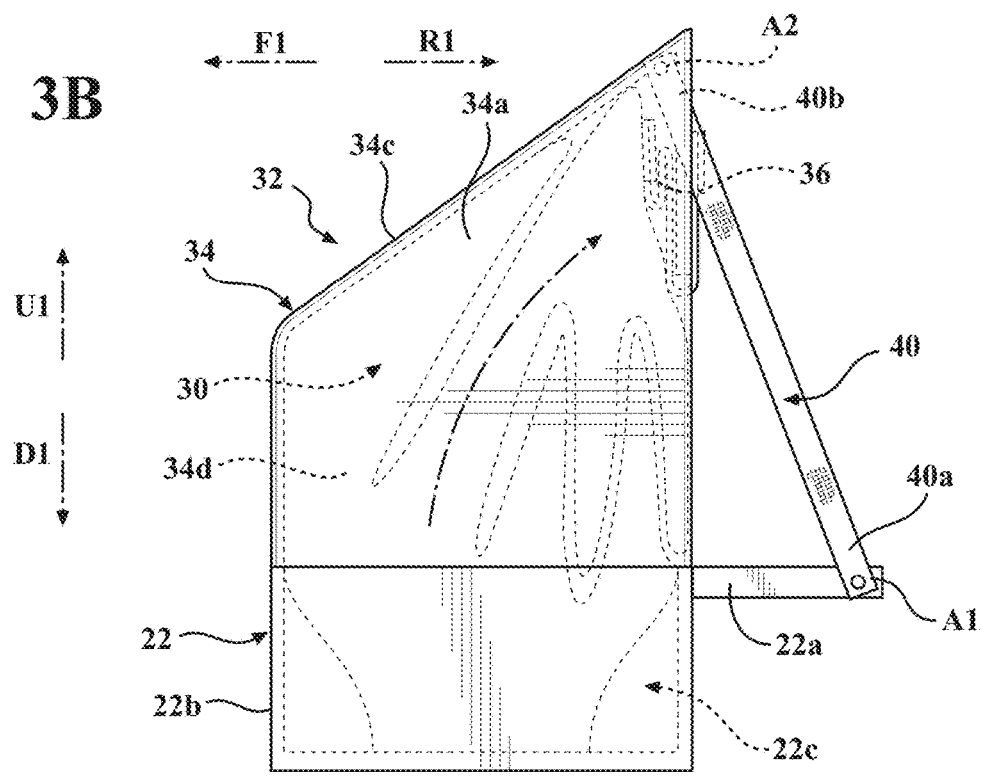
FIG. 3B is a schematic side view of the airbag module of FIG. 1 showing the inflatable cushion in an initial stage of deployment wherein a deployment channel of the module has been extended upwardly and in an occupant contact direction by expansion of the inflatable cushion.
Figure 3C:
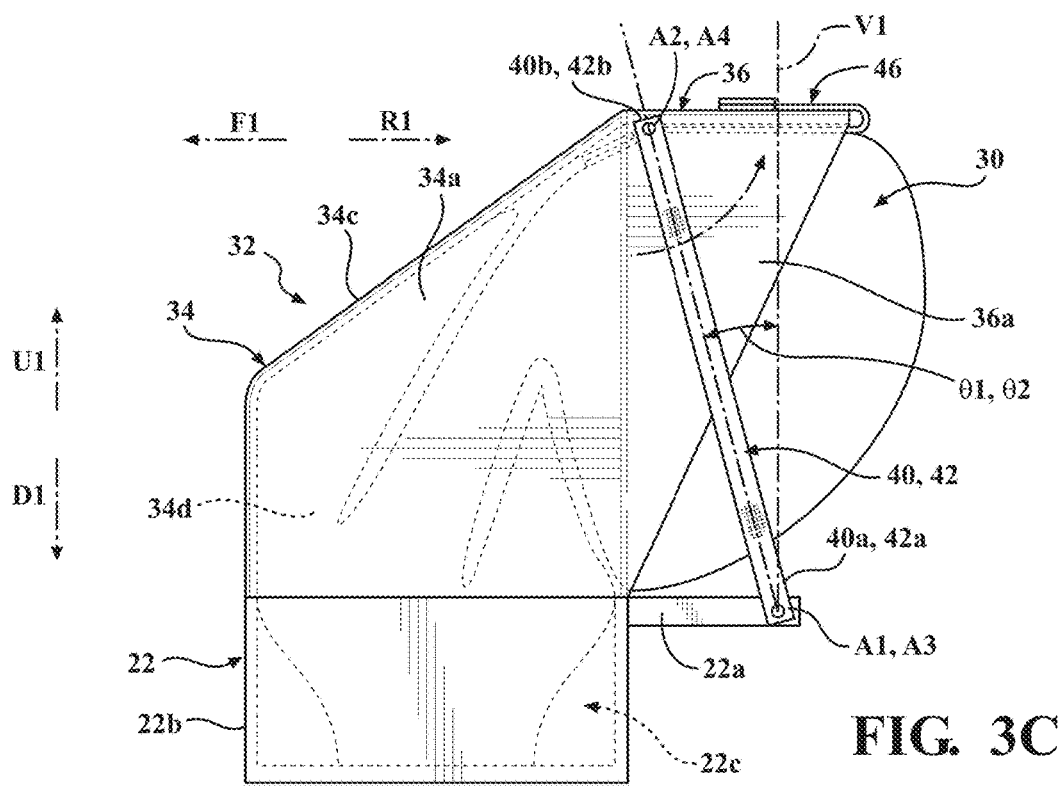
FIG. 3C is a schematic side view of the airbag module of FIG. 3A showing the inflatable cushion in a later stage of deployment wherein an extension channel of the module has been extended in the occupant contact direction from the deployment channel by further expansion of the inflatable cushion.
Figure 3D:
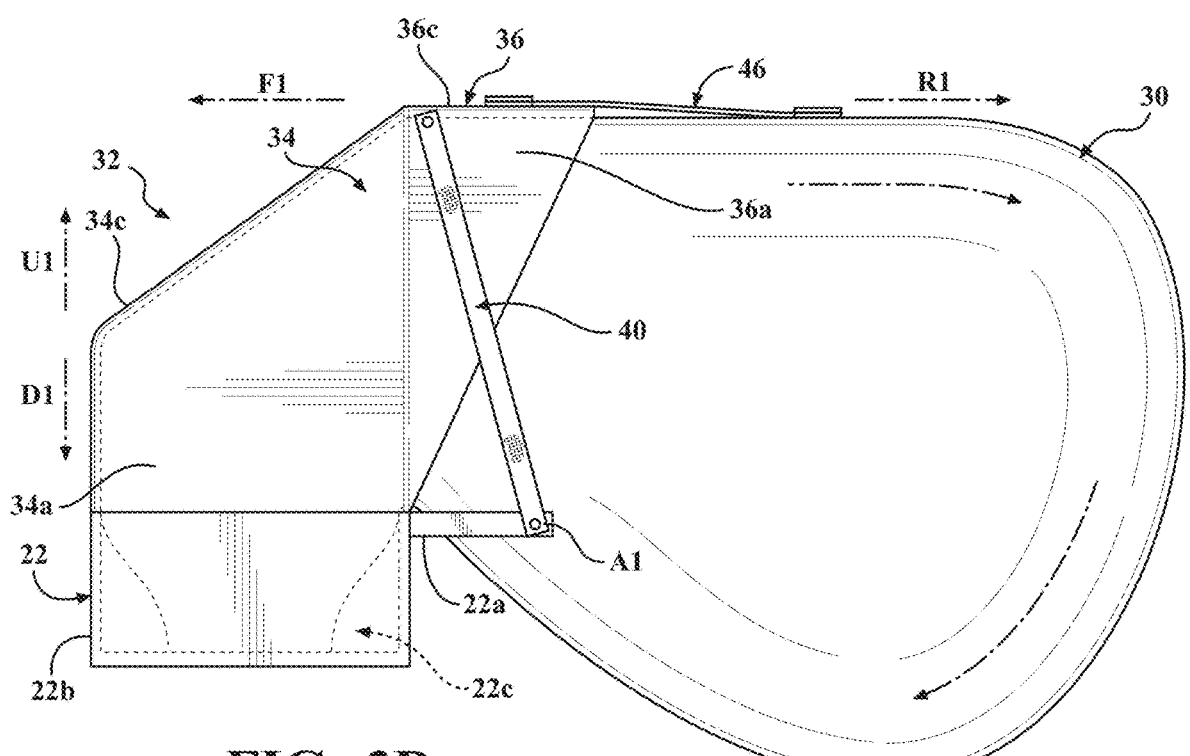
FIG. 3D is a schematic side view of the airbag module of FIG. 3B, showing the inflatable cushion in the fully deployed condition of FIG. 1.
Figure 4:
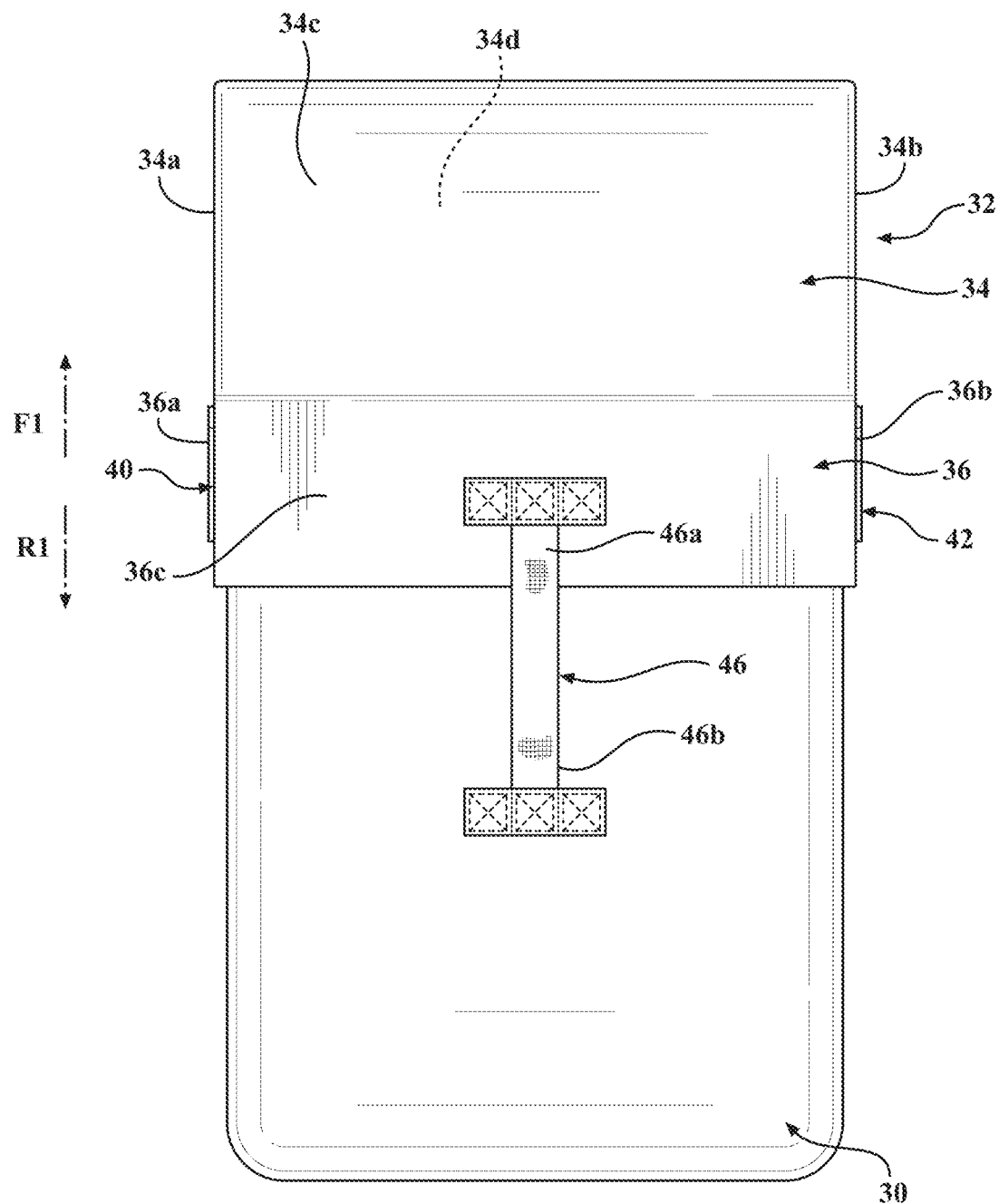
FIG. 4 is a schematic plan view of the airbag module of FIG. 3D, showing the cushion the fully deployed condition.

FIGS. 3A-4 illustrate deployment and operation of an airbag module structured as shown in FIG. 1. FIG. 3A is a schematic side view of the airbag module prior to deployment of an inflatable cushion incorporated into the airbag module. The airbag module may be mounted in the vehicle behind a dashboard or instrument panel, or in another airbag module mounting structure (not shown) of the vehicle. The airbag, deployment guide, and tethers may be folded inside the housing cavity as previously described.

FIG. 3B is a schematic side view of the airbag module of FIG. 1 showing the inflatable cushion after activation of the airbag module. The inflatable cushion is shown in an initial stage of deployment in which the deployment channel of the module has been forced to deploy upwardly and in the occupant contact direction by expansion of the inflatable cushion.

FIG. 3C is a schematic side view of the airbag module of FIG. 3A showing the inflatable cushion in a later stage of deployment wherein an extension channel of the module has been extended in the occupant contact direction from the deployment channel by further expansion of the inflatable cushion in the occupant contact direction. FIG. 3D is a schematic side view of the airbag module of FIG. 3B, showing the inflatable cushion in the fully deployed condition of FIG. 1. FIG. 4 is a schematic plan view of the airbag module of FIG. 3D, showing the cushion in the fully deployed condition.

FIG. 6 is a schematic perspective view of an airbag module 120 in accordance with another embodiment described herein, showing the inflatable cushion 30 in a fully deployed condition similar to that shown in FIG. 3D. The embodiment shown in FIG. 6 may have the same structure as the embodiment shown in FIGS. 1-4, except for the first side and second side tether orientations when the airbag module is deployed. First side tether 140 may include a first portion 140a structured to be attachable to a portion of the vehicle at a first attachment location AA1 as previously described. However, in the arrangement shown in FIG. 6, the second attachment location AA2 of the first side tether 140 at tether end 140b is positioned vertically above the first attachment location AA1 of the first side tether 140 when the airbag module 120 is mounted on the vehicle and the deployment guide 32 is in its deployed condition.

The airbag module 120 may be structured so that the first side tether 140 extends from the first attachment location AA1 vertically with respect to a horizontal ground surface on which the vehicle resides, within a tolerance angle $\Phi 1$ as shown in FIG. 6. In particular arrangements, the angle $\Phi 1$ may be 10° in either the occupant contact direction or a direction opposite the occupant contact direction from the vertical.

Similarly, second side tether 142 may include a first portion 142*a* structured to be attachable to a portion of a vehicle at a first attachment location AA3 as previously described. However, in the arrangement shown in FIG. 6, the second attachment location AA4 of the second side tether 142 is positioned vertically above the first attachment location AA3 of the second side tether 142 when the airbag module 120 is mounted on the vehicle and the deployment guide 32 is in its deployed condition. The airbag module 120 may be structured so that the second side tether 142 extends from the first attachment location AA3 vertically with respect to a horizontal ground surface on which the vehicle resides, within a tolerance angle $\Phi 2$ as shown in FIG. 6. In particular arrangements, the angle $\Phi 2$ may be 10° in either the occupant contact direction or a direction opposite the occupant contact direction from the vertical.

FIG. 7 is a schematic perspective view of an airbag module in accordance with another embodiment 320 described herein, incorporating a continuous tether attached to an extension channel of the airbag module. A "continuous tether" is a tether having portions that extend as a continuous structure along both sides of the deployment guide and also along a connecting portion of a deployment channel and/or a connecting portion of an extension channel of the deployment guide. for example, referring to FIG. 7, the continuous tether 1141 may include first side tether 1140 with first side tether second portion 1140*b* attached to the extension channel connecting portion 36*c*. The continuous tether 1141 may also include second side tether 1142 with second side tether second portion 1142*b* attached to the extension channel connecting portion 36*c*. The continuous tether 1141 may also include a spanning tether segment 1144 extending along the extension channel connecting portion 36*c* and connecting the first side tether second portion 1140*b* and the second side tether second portion 1142*b*. In this arrangement, the first side tether 1140, the second side tether 1142 and the spanning tether segment 1144 may be structured to form, in combination, the continuous tether 1141.

In particular arrangements, the intermediate tether 46 may be attached to continuous tether 1141. In one or more arrangements, the continuous tether 1141 may be formed unitarily as a single structure. In other arrangements, the continuous tether may be formed by attaching separate tether segments to each other end-to-end. In one or more arrangements, the spanning tether segment 1144 may be attached to the extension channel connecting portion 36*c*.

In general, a continuous tether may be formed from a spanning tether segment as described above and first and second side tethers or tether segments attached to opposite ends of the spanning tether segment and extending along opposite sides of the deployment guide.

Figure 8:
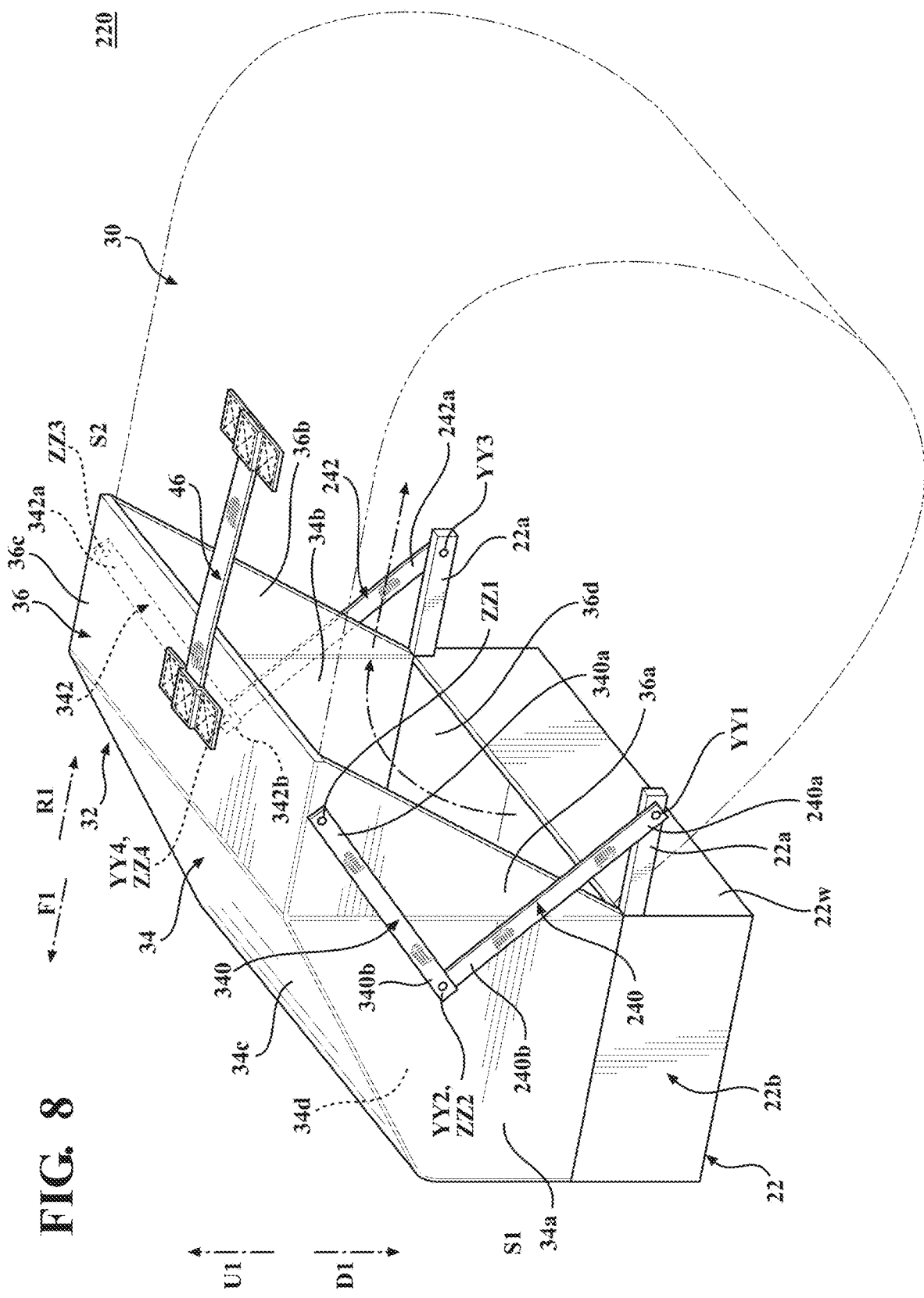
FIG. 8 is a schematic perspective view of an airbag module in accordance with yet another embodiment described herein, showing the inflatable cushion in a fully deployed condition similar to that shown in FIG. 3C.

FIG. 8 is a schematic perspective view of an airbag module in accordance with yet another embodiment 220 described herein, showing the inflatable cushion 30 in a fully deployed condition similar to that shown in FIG. 3D. The embodiment shown in FIG. 8 may have the same structure as the embodiment shown in FIGS. 1-4, except for the first side and second side tether arrangements when the airbag module 220 is deployed. referring to FIG. 8, first side tether 240 may include a first portion 240*a* structured to be attachable to a portion of the vehicle at a first attachment location YY1 positioned as previously described with respect to airbag module 20. First side tether 240 may also include a second portion 240*b* structured to be attachable at a second attachment location YY2 to the deployment channel 34 along deployment channel first side portion 34*a*.

Airbag module 220 may also include another first side tether 340 structured to extend along the first side S1 of the deployment guide 32. Other first side tether 340 may have a first portion 340*a* attached to the extension channel 36 at a first attachment location ZZ1 of the other first side tether 340. Other first side tether 340 may also have a second portion 340*b* attached to the deployment channel at a second attachment location ZZ2 of the other first side tether 340. In addition, the second attachment location ZZ2 of the other first side tether 340 may be structured to reside below the first attachment location ZZ1 of the other first side tether 340 when the airbag module 220 is mounted on the vehicle and the deployment channel 34 is in the deployed condition. In particular arrangements, the second attachment location ZZ2 of the other first side tether 340 is also structured to reside in a direction opposite the occupant contact direction with respect to the first attachment location ZZ1 of the other first side tether 340 when the airbag module 220 is mounted on the vehicle and the deployment channel 34 is in the deployed condition. In particular arrangements, the second attachment location ZZ2 of the other first side tether 340 may be the same as second attachment location YY2 of the first side tether 240.

Similarly, second side tether 242 may include a first portion 242*a* structured to be attachable to a portion of the vehicle at a first attachment location YY3 as previously described with respect to airbag module 20. first side tether 240 may also include a second portion 242*b* structured to be attachable at a second attachment location YY4 to the deployment channel 34 along deployment channel second side portion 34*b*. Airbag module 220 may also include another second side tether 342 structured to extend along the second side S2 of the deployment guide 32. Other second side tether 342 may have a first portion 342*a* attached to the extension channel 36 at a first attachment location ZZ3 of the other second side tether 342. other second side tether 342 may also have a second portion 342*b* attached to the deployment channel 34 at a second attachment location ZZ4 of the other second side tether, along second side S2. In addition, the second attachment location ZZA of the other second side tether 342 may be structured to reside below the first attachment location ZZ3 of the other second side tether 342 when the airbag module 220 is mounted on the vehicle and the deployment channel 34 is in the deployed condition. In particular arrangements, the second attachment location ZZ4 of the other second side tether 342 is structured to reside in a direction opposite the occupant contact direction with respect to of the first attachment location ZZ3 of the other second side tether when the airbag module 220 is mounted on the vehicle and the deployment channel 34 is in the deployed condition. In particular arrangements, the second attachment location ZZ4 of the other second side tether 342 may be the same as second attachment location YY4 of the second side tether 242.

As described herein, expansion of the inflatable cushion 30 causes deployment and tensioning of the tethers described herein. When the tethers have been deployed and tensioned by expansion of the inflatable cushion, the various side tether arrangements operate to reinforce and stiffen the deployed shapes of the deployment and extension channels. The portions of the deployed deployment and extension channels function as reaction surfaces configured to control the shape of the inflatable cushion, and to focus and guide expansion of the inflatable cushion in a desired direction for protecting a vehicle occupant. These reaction surfaces also operate to absorb forces resulting from the impact of a vehicle occupant on the deployed inflatable cushion. Thus, the reaction surfaces provided by the deployment and extension channels (as stiffened by the tethers) obviate the need to use the vehicle front windshield as a reaction surface for deployment and operation of the inflatable cushion.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An airbag module comprising:
a housing;
an inflatable cushion structured to be received in the housing;
a deployment guide attached to the housing and structured to be deployable from the housing to a deployed condition to guide the inflatable cushion in an occupant contact direction; and
a first side tether structured to extend along a first side of the deployment guide, the first side tether including:
a first portion structured to be attachable to a portion of a vehicle at a first attachment location of the first side tether spaced apart, in the occupant contact direction, from a rearward wall of the housing facing in the occupant contact direction when the airbag module is mounted on the vehicle; and
a second portion structured to be attachable to the deployment guide at a second attachment location of the first side tether structured to reside above the first attachment location of the first side tether when the airbag module is mounted on the vehicle and the deployment guide is in its deployed condition.

2. The airbag module of claim 1, wherein the deployment guide comprises:
a deployment channel attached to the housing; and
an extension channel attached to the deployment channel and having:
a first side portion with an edge attached to and extending along the deployment channel;
a second side portion with an edge attached to and extending along the deployment channel opposite the first side portion; and
a connecting portion extending between and connecting the first and second side portions.

3. The airbag module of claim 2, wherein the first side tether second attachment location is along the deployment channel.

4. The airbag module of claim 3, further comprising another first side tether structured to extend along the first side of the deployment guide and having a first portion attached to the extension channel at a first attachment location of the another first side tether, and a second portion attached to the deployment channel at a second attachment location of the another first side tether, the second attachment location of the another first side tether being structured to reside below the first attachment location of the another first side tether when the airbag module is mounted on the vehicle and the deployment channel is in its deployed condition.

5. The airbag module of claim 4, further comprising:
a second side tether structured to extend along a second side of the deployment channel opposite the first side, the second side tether having a first portion structured to be attachable to a portion of the vehicle at a first attachment location of the second side tether when the airbag module is mounted on the vehicle, and a second portion attached to the deployment guide at a second attachment location of the second side tether, the second attachment location being structured to reside above the first attachment location of the second side tether when the airbag module is mounted on the vehicle and the deployment channel is in its deployed condition; and
another second side tether structured to extend along the second side of the deployment guide, the another second side tether having a first portion attached to the extension channel at a first attachment location of the another second side tether, and a second portion attached to the deployment channel at a second attachment location of the another second side tether, the second attachment location of the another second side tether being structured to reside below the first attachment location of the another second side tether when the airbag module is mounted on the vehicle and the deployment channel is in its deployed condition.

6. The airbag module of claim 4, wherein the second attachment location of another first side tether is the same as second attachment location of the first side tether.

7. The airbag module of claim 2, wherein the first side tether second attachment location is along the extension channel.

8. The airbag module of claim 2, further comprising at least one intermediate tether having a first portion attached to the extension channel connecting portion and a second portion attached to the inflatable cushion, wherein the intermediate tether is structured to exert a force in the occupant contact direction on the extension channel connecting portion and the attached deployment channel, during inflation of the cushion.

9. The airbag module of claim 1, further comprising a second side tether structured to extend along a second side of the deployment guide, the second side tether including:
a first portion structured to be attachable to a portion of the vehicle at a first attachment location of the second side tether spaced apart, in the occupant contact direction, from the rearward wall of the housing facing in the occupant contact direction when the airbag module is mounted on the vehicle; and a second portion structured to be attachable to the deployment guide at a second attachment location of the second side tether structured to reside above the first attachment location of the second side tether when the airbag module is mounted on the vehicle and the deployment guide is in its deployed condition.

10. The airbag module of claim 1, wherein the housing includes:
a body defining a cavity structured to receive therein the inflatable cushion and the deployment guide prior to deployment of the cushion; and
a tether anchor extending from the rearward wall housing body in the occupant contact direction, wherein the first attachment location is along the tether anchor.

11. An airbag module comprising:
a housing;
an inflatable cushion structured to be received in the housing; and
a deployment guide structured to be deployable from the housing to a deployed condition to guide the inflatable cushion in an occupant contact direction, the deployment guide including:
a deployment channel attached to the housing;
an extension channel attached to the deployment channel and having:
a first side portion with an edge attached to and extending along the deployment channel;
a second side portion with an edge attached to and extending along the deployment channel opposite the first side portion; and
a connecting portion extending between and connecting the first and second side portions;
and
a first side tether structured to extend along a first side of the deployment guide, the first side tether including:
a first portion structured to be attachable to a portion of a vehicle at a first attachment location of the first side tether when the airbag module is mounted on the vehicle; and
a second portion structured to be attachable to the deployment guide at a second attachment location of the first side tether, the second attachment location being structured to reside above the first attachment location of the first side tether when the airbag module is mounted on the vehicle and the deployment guide is in its deployed condition.

12. The airbag module of claim 11, further comprising another first side tether structured to extend along the first side of the deployment guide and having a first portion attached to the extension channel at a first attachment location of the another first side tether, and a second portion attached to the deployment channel at a second attachment location of the another first side tether, the second attachment location of the another first side tether being structured to reside below the first attachment location of the another first side tether when the airbag module is mounted on the vehicle and the deployment channel is in its deployed condition.

13. The airbag module claim 12, wherein the second attachment location of the another first side tether is structured to reside in a direction opposite the occupant contact direction from the first attachment location of the another first side tether when the airbag module is mounted on the vehicle and the deployment channel is in its deployed condition.

14. The airbag module of claim 12, further comprising:
a second side tether structured to extend along a second side of the deployment channel opposite the first side, the second side tether having a first portion structured to be attachable to a portion of the vehicle at a first attachment location of the second side tether when the airbag module is mounted on the vehicle, and a second portion attached to the deployment guide at a second attachment location of the second side tether, the second attachment location being structured to reside above the first attachment location of the second side tether when the airbag module is mounted on the vehicle and the deployment channel is in its deployed condition; and
another second side tether structured to extend along the second side of the deployment guide, the another second side tether having a first portion attached to the extension channel at a first attachment location of the another second side tether, and a second portion attached to the deployment channel at a second attachment location of the another second side tether, the second attachment location of the another second side tether being structured to reside below the first attachment location of the another second side tether when the airbag module is mounted on the vehicle and the deployment channel is in its deployed condition.

15. The airbag module of claim 12, wherein the second attachment location of the another first side tether is positioned in a direction opposite the occupant contact direction from the first attachment location of the another first side tether when the airbag module is mounted on the vehicle and the deployment guide is in its deployed condition.

16. The airbag module of claim 11, wherein the first attachment location of the first side tether is spaced apart, in the occupant contact direction, from a wall of the housing facing in the occupant contact direction when the airbag module is mounted on the vehicle.

17. The airbag module of claim 11, further comprising a second side tether structured to extend along a second side of the deployment guide opposite the first side, the second side tether including:
a first portion structured to be attachable to a portion of the vehicle at a first attachment location of the second side tether when the airbag module is mounted on the vehicle; and
a second portion attached to the deployment guide at a second attachment location of the second side tether, the second attachment location being structured to reside above the first attachment location of the second side tether when the airbag module is mounted on the vehicle and the deployment guide is in its deployed condition.

18. The airbag module of claim 17, wherein the second attachment location of the first side tether is positioned vertically above the first attachment location of the first side tether when the airbag module is mounted on the vehicle and the deployment guide is in its deployed condition, and wherein the second attachment location of the second side tether is positioned vertically above the first attachment location of the second side tether when the airbag module is mounted on the vehicle and the deployment guide is in its deployed condition.

19. The airbag module of claim 17, wherein the first side tether second portion is attached to the extension channel connecting portion and the second side tether second portion is attached to the extension channel connecting portion, the airbag module further comprising a spanning tether segment extending along the extension channel connecting portion and connecting the first side tether second portion and the second side tether second portion, the first side tether, the second side tether and the spanning tether segment combining to form a continuous tether.

20. The airbag module of claim 19, further comprising at least one intermediate tether having a first portion attached to the continuous tether and a second portion attached to the inflatable cushion, wherein the intermediate tether is structured to exert a force in the occupant contact direction on the extension channel connecting portion and the attached deployment channel, during inflation of the cushion.

\* \* \* \* \*